(12) United States Patent
Ahn et al.

(10) Patent No.: US 7,279,863 B2
(45) Date of Patent: Oct. 9, 2007

(54) METHOD AND APPARATUS FOR DETECTING EXCITATION POSITION OF SRM BY COMPARISON OF DETECTED CURRENT

(75) Inventors: Jin-Woo Ahn, Busan (KR); Dong-Hee Lee, Busan (KR); Tae-Hyoung Kim, Busan (KR)

(73) Assignee: SR Technologies, Inc., Busan (KR)

( * ) Notice: Subject to any disclaimer, the term of this patent is extended or adjusted under 35 U.S.C. 154(b) by 0 days.

(21) Appl. No.: 11/334,121

(22) Filed: Jan. 17, 2006

(65) Prior Publication Data

US 2007/0075671 A1    Apr. 5, 2007

(30) Foreign Application Priority Data

Oct. 4, 2005    (KR)  ..................... 10-2005-0093113

(51) Int. Cl.
*H02P 1/46*    (2006.01)
(52) U.S. Cl.  ..................... 318/701; 318/254; 318/138; 318/439; 318/700
(58) Field of Classification Search ................ 318/701, 318/254, 138, 439, 798, 871, 700; 322/94, 322/95; 363/20
See application file for complete search history.

(56) References Cited

U.S. PATENT DOCUMENTS

| | | | |
|---|---|---|---|
| 4,870,559 A | 9/1989 | Hyatt ............................ 700/1 |
| 5,705,918 A * | 1/1998 | Davis ........................... 322/94 |
| 6,087,948 A | 7/2000 | Oveby et al. ................ 340/635 |
| 6,212,230 B1 | 4/2001 | Rybicki et al. .............. 375/239 |
| 6,281,828 B1 | 8/2001 | Kimura et al. ............... 341/155 |
| 6,492,911 B1 | 12/2002 | Netzer .................... 340/870.37 |
| 6,509,710 B2 | 1/2003 | Grasso et al. ................ 318/701 |
| 6,564,168 B1 | 5/2003 | Hasser ........................ 702/163 |
| 6,586,897 B2 | 7/2003 | Kim et al. .................... 318/254 |
| 6,668,666 B1 | 12/2003 | Chen et al. |

FOREIGN PATENT DOCUMENTS

WO    WO 01/73938    10/2001
WO    WO 2003/100948    12/2003

\* cited by examiner

*Primary Examiner*—Karen Masih
(74) *Attorney, Agent, or Firm*—J.C. Patents

(57) ABSTRACT

Disclosed is a method and apparatus for detecting an excitation position of an SRM by comparison of detected currents. The method includes detecting a current by applying a first test voltage to each phase of the SRM, detecting a current by applying a second test voltage to each phase, determining an operation state of the SRM based on a deviation between the currents detected in any one of the phases, determining the operation state of the SRM as a rotation state if the deviation value exceeds a predetermined value, and applying a third test voltage to a phase excited just prior to a current excited phase to detect the current and turning on a phase to be next excited if the detected current value is more than a first reference value, and turning off the phase excited just prior to the presently excited phase if the detected current value is more than a second reference value. The phase excitation position is accurately detected according to the rotating speed without using a position sensor.

8 Claims, 17 Drawing Sheets

METHOD AND APPARATUS FOR DETECTING EXCITATION POSITION OF SRM BY COMPARISON OF DETECTED CURRENT

BACKGROUND OF THE INVENTION

1. Field of the Invention

The present invention relates to a method and apparatus for detecting an excitation position of an SRM by comparison of detected currents, and more particularly to a method and apparatus for detecting an excitation position of an SRM, which can determine the time of a phase excitation by simply comparing detected currents, without using a position detection sensor.

2. Description of the Prior Art

A switched reluctance motor (hereinafter referred to as an "SRM") is a power drive device which can be easily manufactured, be inexpensively manufactured, and have relatively high reliability since it is proof against drive accidents. Hence, an SRM drive system has some characteristics comparable with an existing induction motor or a permanent magnet motor, in view of high torque, a high volume, a high output, a high-efficient variable speed drive, and an economic inverter power in applied fields such as industry machinery, airplanes, automobiles, consumer devices, and others.

Meanwhile, the SRM essentially needs the position of a rotor, owing to a motor driving mechanism. Specifically, the rotor and stator of the SRM have a double salient pole in order to maximize variable reluctance torque. The SRM receives information on the position of the stator, and properly implements the phase excitation to generate needed torque. A price of the encoder or resolver of the SRM is similar to a manufacturing cost of an original motor. Therefore, it is difficult to be applied to a simple rotor, due to such an expensive position detection sensor. Also, the high resolution encoder to be used for more precisely drive is not applied to the simple rotor.

The research and development of a conventional SRM have been implemented to improve torque, efficiency and reliability, and also reduce a cost. The development of the SRM has been concentrated on a proper magnetic circuit and a control strategy. Thus, a sensorless control having no encoder has been searched in order to reduce an expense, improve environmental stress-crack resistance, and obtain good stability. When a use range of the SRM is expanded into the consumer devices and other industry motor, the expensive position sensor is in the way. The following methods have been proposed to overcome the above drawback: a method of simplifying the structure of the position sensor; and a method of detecting a phase current, calculating an inductance from the detected current, and converting this into the position.

FIG. 1 is a graph depicting a process of detecting the position of the rotor through a conventional inductance estimation method. In general, the inductance estimation method applies a pulsed test voltage to the whole domains of the phase which is not excited, and calculates the inductance of the phase applied with the pulsed voltage according to a waveform of the detected current to be generated. An inductance of each phase is operated from the calculated inductance by use of a mechanical angle of the motor between the phases, thereby estimating a present position of the rotor. Other methods using the detected current are based on the inductance.

The above method may obtain a good effect if the number of phases of the SRM is more than 4, since there necessarily is a phase which is not excited. However, the conventional inductance estimation method has the following problems. First, it is difficult to apply the method, since all phases are overlapped in the 3-phase SRM. Second, the excitation voltage for generating the detected current has to be applied for a short period not to affect the drive torque. Third, since the inductance is calculated from the current detected by a current sensor and the inductances of the remaining phases are estimated based on the calculated inductance, a high performance operation system is required due to the complicated operation procedure. And, finally, the rotor has to be in rotation during the conventional sensorless control. Hence, each phase is excited in turn, and the rotor is rotated in any direction to detect and control the position. In this case, there is a safety problem due to a load condition, if reverse rotation has not to be implemented at start-up.

SUMMARY OF THE INVENTION

Accordingly, the present invention has been made to solve the above-mentioned problems occurring in the prior art, and an object of the present invention is to provide a method and apparatus of detecting an excitation position of an SRM by comparison of detected currents which can detect a position of a phase excitation according to a speed of a rotor, without using a position sensor such as an encoder or a resolver.

Another object of the present invention is to provide a method and apparatus of detecting an excitation position of an SRM by comparison of detected currents which can detect a position of a phase excitation, without using a complicated operation procedure or high performance operation system.

Still another object of the present invention is to provide a method and apparatus of detecting an excitation position of an SRM by comparison of detected currents which can detect a position of a phase excitation, without rotating a rotor in a reverse direction for the start-up.

In order to accomplish these objects, according to one aspect of the present invention, there is provided a method of detecting an excitation position of an SRM by comparison of detected currents, the method comprising the steps of detecting a current by applying a first test voltage to each phase of the SRM, detecting a current by applying a second test voltage to each phase, and determining an operation state of the SRM based on a deviation between the currents detected in any one of the phases.

Preferably, the method further comprises determining the operation state of the SRM as a standstill state if the deviation value is less than a predetermined value, and determining a phase to be excited by mapping current values of the respective phases detected by applying the second test voltage onto a predetermined table.

Preferably, in the table, the phase to be excited is designated so that a rotor is rotated with a phase in which a smallest current is detected by using the current values of the respective phases and a switching pattern of the rotor.

Preferably, the method further comprises determining the operation state of the SRM as a rotation, state, if the deviation value exceeds a predetermined value, and applying a third test voltage to a phase excited just prior to the presently excited phase to detect the current, and turning on a phase to be next excited if the detected current value is more than a first reference value, and turning off the phase excited just prior to the presently excited phase if the detected current is more than a second reference value.

Preferably, the current detected by applying the third test voltage to the phase is a current accumulatively added by applying the third test voltage consisting of two pulsed voltages, and if the accumulatively added current exceeds the second reference value, a negative pulse voltage is applied so that the accumulatively added current becomes zero.

Preferably, the first reference value is less than the second reference value.

In order to accomplish these objects, according to another aspect of the present invention, there is provided an apparatus for detecting an excitation position of an SRM, comprising a test-voltage applying unit for applying a test voltage to the SRM, a current detecting sensor for detecting a current generated by the test voltage, and a switching pattern control unit for controlling the test-voltage applying unit to apply the test voltage to a phase excited just prior to a presently excited phase, turning on a phase to be next excited if the detected current value is more than a first reference value, and turning off the phase excited just prior to the presently excited phase if the detected current value is more than a second reference value.

Preferably, the switching pattern control unit controls the test-voltage applying unit to apply the first and second test voltages to each phase of the SRM and determines an operation state of the SRM based on a deviation between the currents detected in any one of the phases of the SRM.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
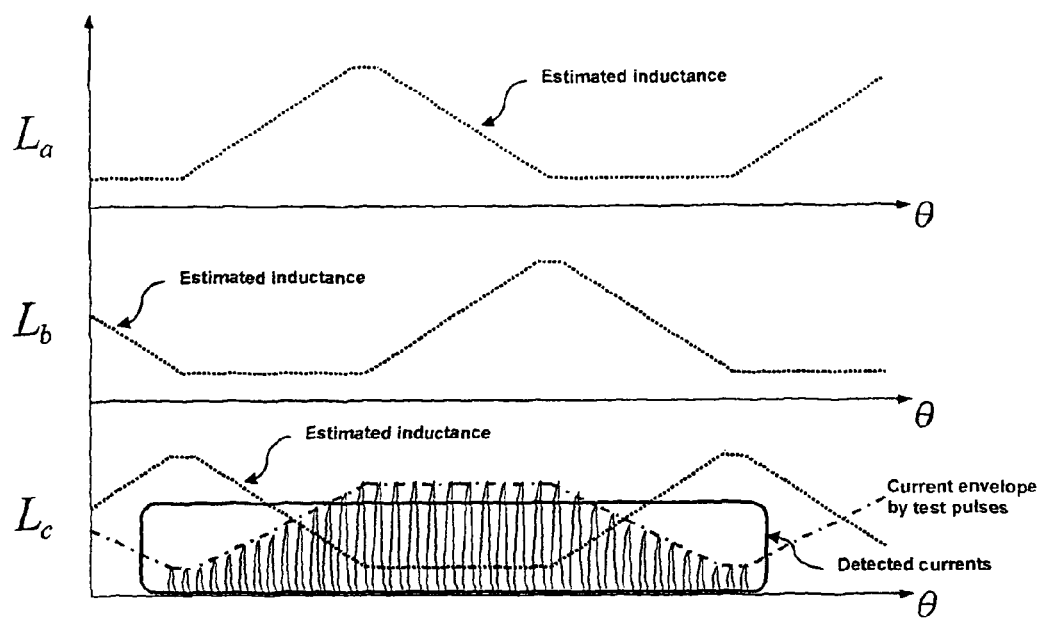
FIG. 1 is a graph depicting a process of detecting a position of a rotor through a conventional inductance estimation method.

Hereinafter, a preferred embodiment of the present invention will be described with reference to the accompanying drawings. In the following description and drawings, the same reference numerals are used to designate the same or similar components, and so repetition of the description on the same or similar components will be omitted.

An apparatus and method of detecting a motion direction of an object according to the present invention will now be described with reference to the accompanying drawings.

Figure 2:
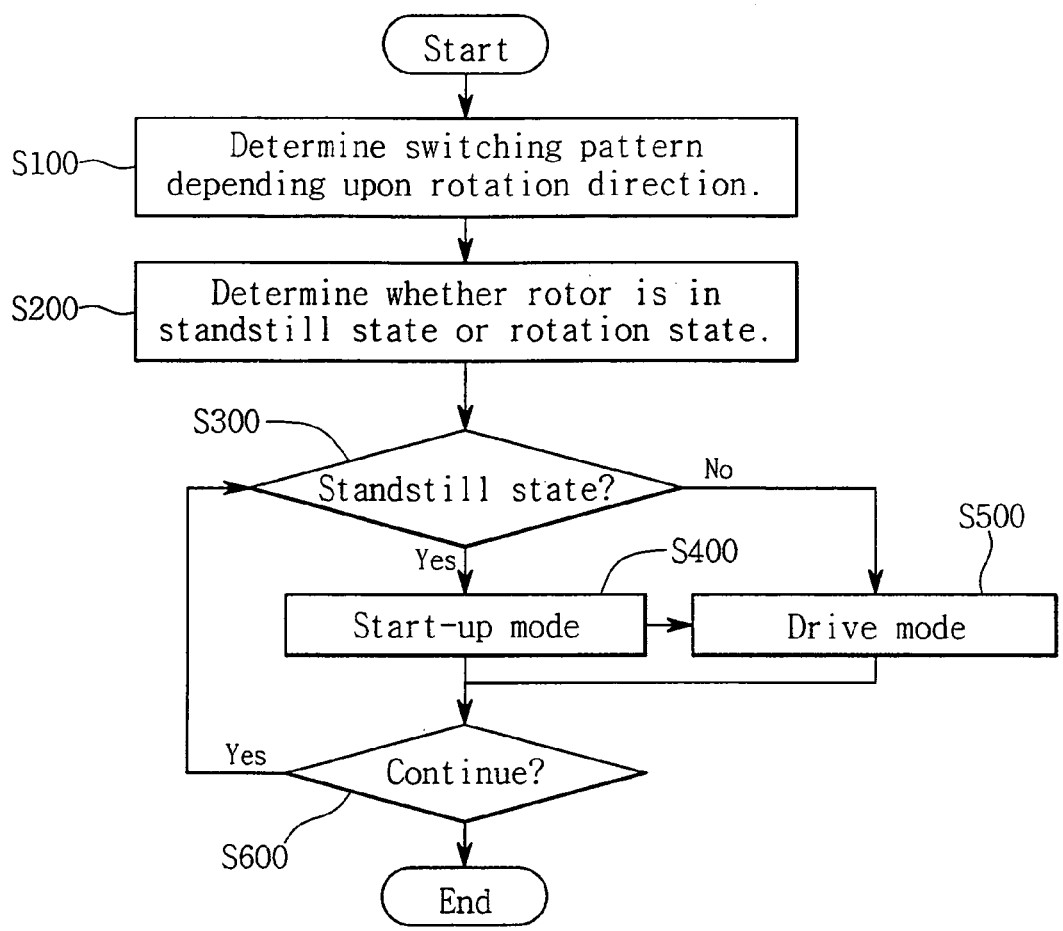
FIG. 2 is a flowchart illustrating a process of detecting a phase excitation position according to an embodiment of the present invention.

FIG. 2 is a flowchart illustrating a process of detecting a phase excitation position according to an embodiment of the present invention.

Figure 3A:
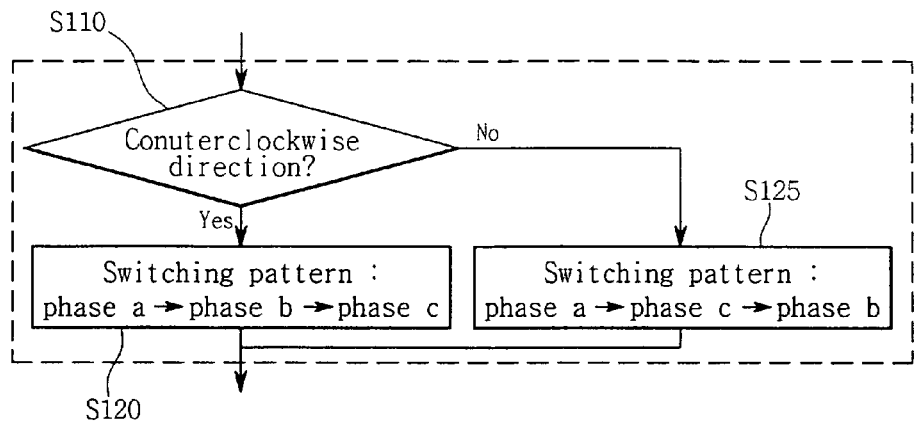
FIG. 3a is a flowchart concretely explaining the process of determining the switching pattern shown in FIG. 2.

The switching pattern of an SRM is determined depending upon a rotation direction (step S100). The switching pattern is an important factor used to determine an initially excited phase in a standstill state and a next excited phase in a rotation state. FIG. 3a is a flowchart concretely explaining a process of determining the switching pattern shown in FIG. 2. The switching pattern is determined as either of clockwise rotation and counterclockwise rotation in correspondence to a user demand (step S110). If the switching pattern is determined as the counterclockwise rotation, the phase excitation is selected in a sequence of phase a→phase b→phase c (step S120). Meanwhile, if the switching pattern is determined as the clockwise rotation, the phase excitation is selected in a sequence of phase a→phase c→phase b (step S125).

Figure 3B:
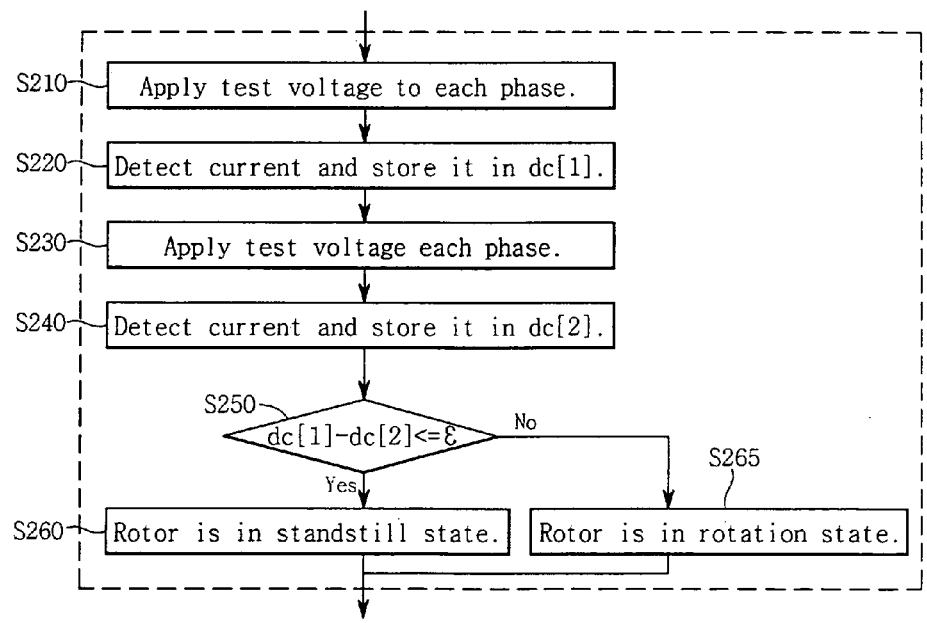
FIG. 3b is a flowchart concretely explaining the process of determining whether the SRM is in the standstill state or rotation state, which is shown in FIG. 2.
Figure 4A:
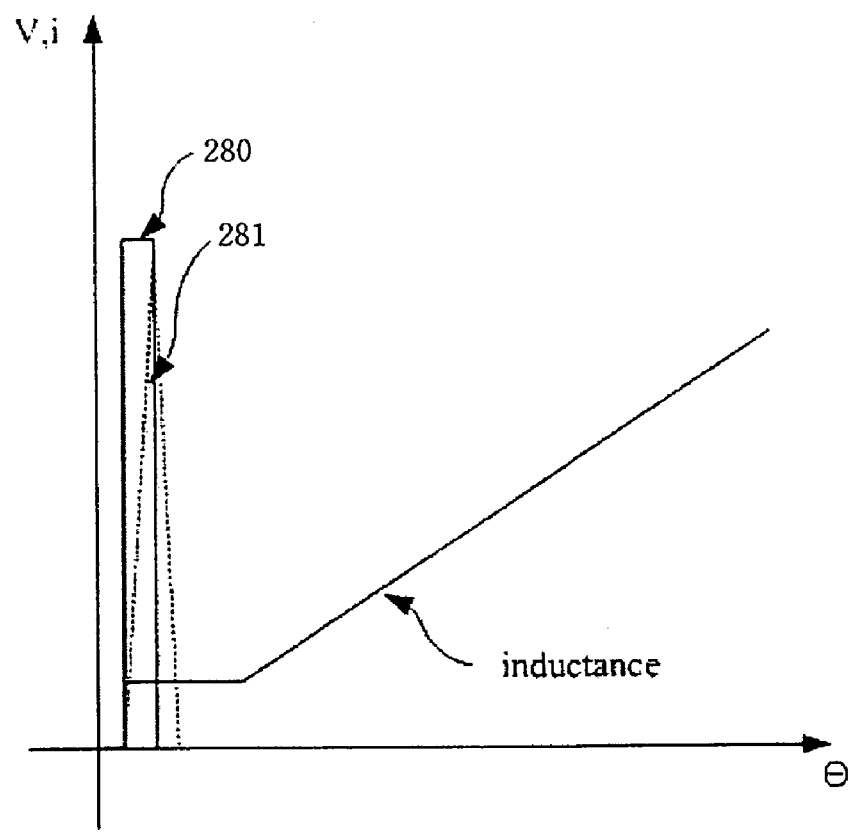
FIGS. 4a and 4b are graphs depicting the test voltage and the detected current generated by applying the test voltage.
Figure 4B:
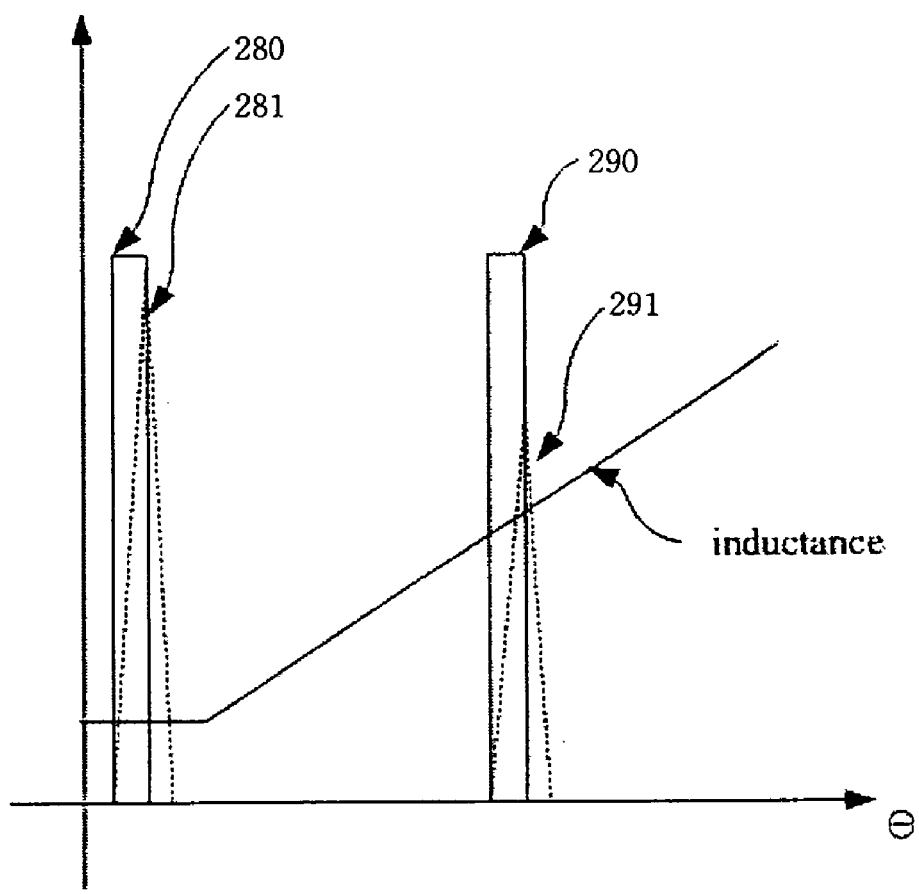

After the switching pattern has been determined, it is determined whether the SRM is in the standstill state or rotation state by use of a detected current generated when a test voltage is applied to the phase (step S200). FIG. 3b is a flowchart concretely explaining the process of determining whether the SRM is in the standstill state or rotation state, which is shown in FIG. 2. FIGS. 4a and 4b are views depicting the test voltage and the detected current generated by applying the test voltage. FIG. 4a is a graph depicting a type of detected current in a standstill state, while FIG. 4b is a graph depicting a type of detected current in a rotating state.

The first test voltage 280 is applied to each phase (step S210). Preferably, the test voltage is a pulse pattern. The detected current 281 generated after the first test voltage is applied to the phase is stored in a dc[1] (step S220). The second test voltage 290 is applied to each phase (step S230). Preferably, the first test voltage is equal to the second test voltage. The detected current 291 generated after the second test voltage is applied to the phase is stored in a dc[2] (step S240). It is determined whether a deviation (dc[1]-dc[2]) of the detected current generated by applying the first and second test voltages is equal to or less than a predetermined value $\in$ (step S250). If the deviation (dc[1]-dc[2]) of the detected current value is equal to or less than the predetermined value $\in$, it is determined that a rotor is in the standstill state (step S260). If the deviation (dc[1]-dc[2]) of the detected current value is more than the predetermined value ∈, it is determined that a rotor is in the rotation state (step S265).

Figure 5:
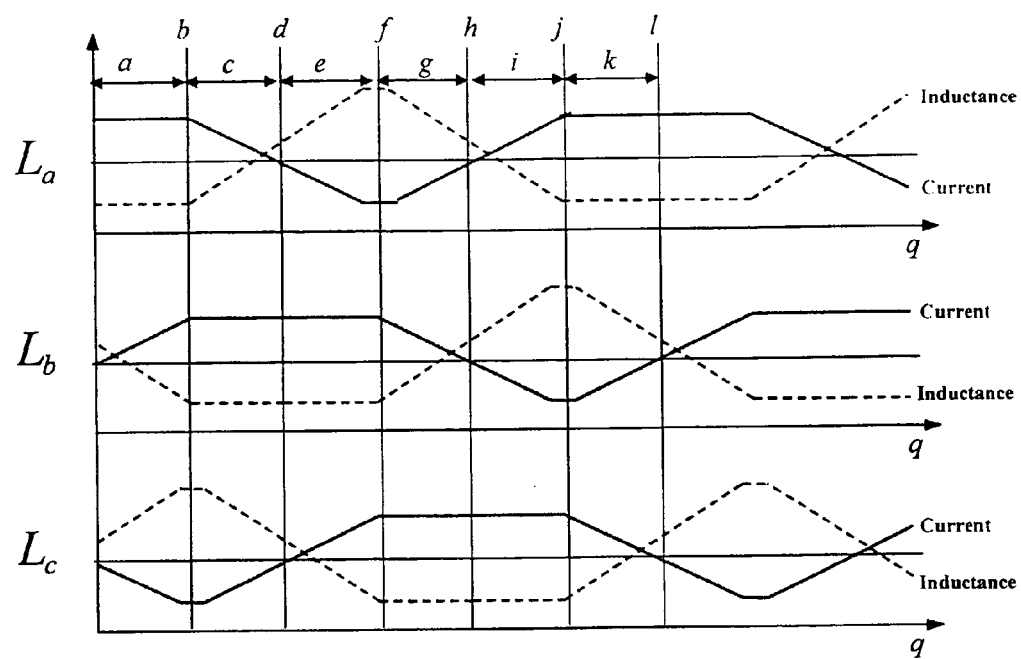
FIG. 5 is a graph depicting an example of current and inductance detected from respective phases La, Lb and Lc generated by applying the test voltage.

It is determined whether the rotor is in the standstill state (step S300). If the rotor is in the standstill state, a start-up mode is performed (step S400). In the start-up mode, the position of the phase to be excited for rotation is determined by use of the detected current value of each phase obtained in the mode determining step (step S200). FIG. 5 is a view depicting an example of inductance and detected current of the respective phases La, Lb and Lc generated by application of the test voltage. The phase current value obtained according to the position of the rotor may be divided into cases a through l. Tables 1 and 2 show examples of the excited phase determined according to the position of the rotor.

TABLE 1

| Case | Current of Phase a | Current of Phase b | Current of Phase c | Excitation Phase | Position in FIG. 5 |
|---|---|---|---|---|---|
| 1 | high | middle | low | a | a |
| 2 | high | high | low | a | b |
| 3 | middle | high | low | a | c |
| 4 | middle | high | middle | a | d |
| 5 | low | high | middle | b | e |
| 6 | low | high | high | b | f |
| 7 | low | middle | high | b | g |
| 8 | middle | middle | high | b | h |
| 9 | middle | low | high | c | i |
| 10 | high | low | high | c | j |
| 11 | high | low | middle | c | k |
| 12 | high | middle | middle | c | l |

TABLE 2

| Case | Current of Phase a | Current of Phase b | Current of Phase c | Excitation Phase | Position In FIG. 5 |
|---|---|---|---|---|---|
| 1 | high | middle | low | b | a |
| 2 | high | high | low | b | b |
| 3 | middle | high | low | b | c |
| 4 | middle | high | middle | b | d |
| 5 | low | high | middle | c | e |
| 6 | low | high | high | c | f |
| 7 | low | middle | high | c | g |
| 8 | middle | middle | high | c | H |
| 9 | middle | low | high | a | I |
| 10 | high | low | high | a | J |
| 11 | high | low | middle | a | k |
| 12 | high | middle | middle | a | l |

Figure 6:
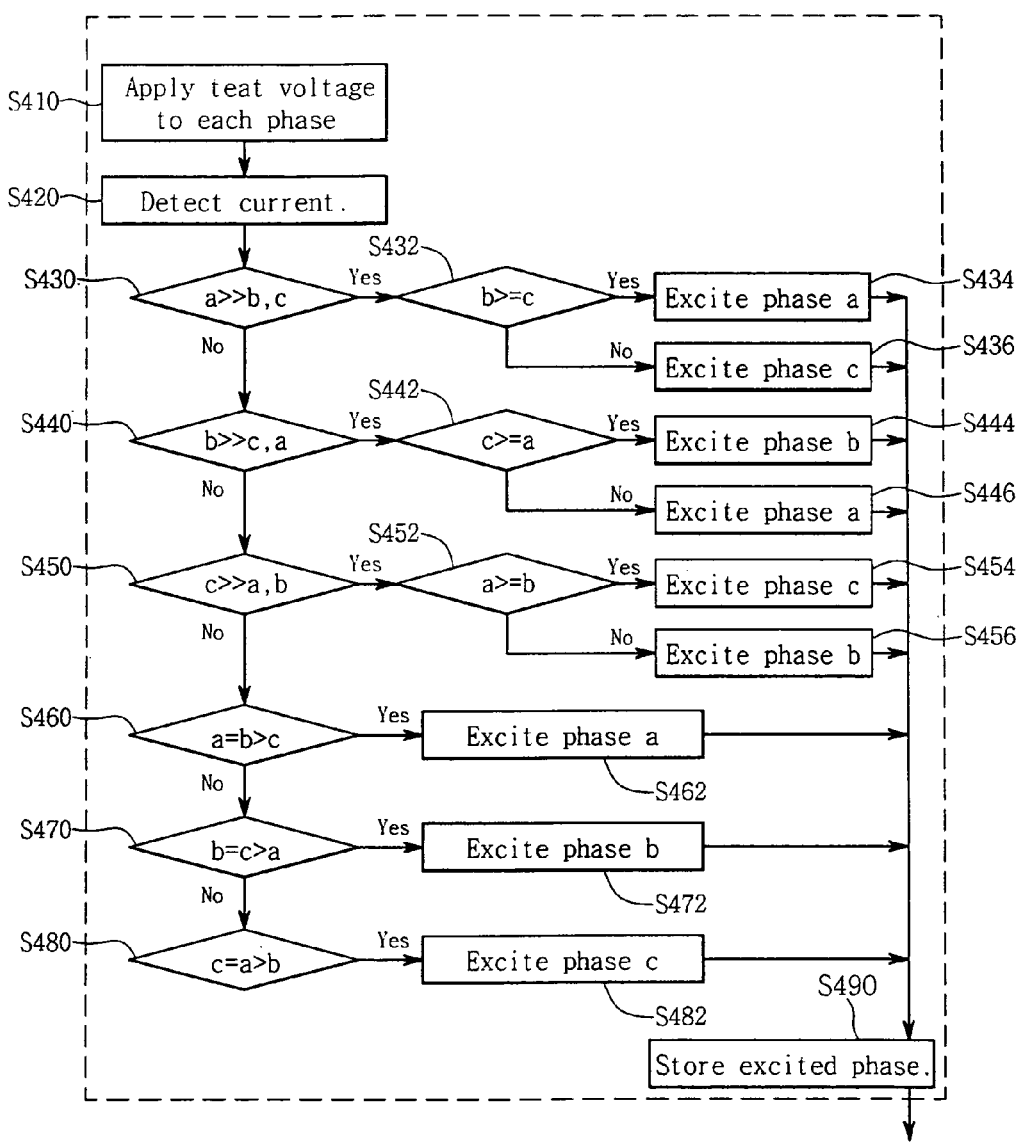
FIG. 6 is a flowchart concretely explaining the process of determining the phase excitation in the start-up mode step shown in FIG. 2.

Table 1 represents the case the rotation direction is a counterclockwise direction (ccw), while Table 2 represents the case the rotation direction is a clockwise direction (cw). The phase to be excited to drive the stopped rotor is varied depending upon the position of the rotor, which will now be described with reference Tables 1 and 2. For example, in case the position of the rotor corresponds to "a" in FIG. 5 (case 1), the current value detected by the pulsed test voltage is in a relation of $i_a > i_b > ic$, and if the rotation direction is a counterclockwise direction, a excitation power is applied to the phase "a". If the excitation power is applied to the phase "a", the rotor can be driven in the counterclockwise direction from the standstill state. In case the position of the rotor corresponds to "f" in FIG. 5 (case 6), the current value detected by the pulsed test voltage is in a relation of $i_b = ic > ia$, and if the rotation direction is a clockwise direction, a excitation power is applied to the phase "c". If the excitation power is applied to the phase "c", the rotor can be driven in the clockwise direction from the standstill state. FIG. 6 is a flowchart concretely explaining the process of determining the phase excitation in the start-up mode step shown in FIG. 2. The test voltage is applied to each phase (step S410). The current of each phase generated by the test voltage is detected (step S420). After comparing each current value, the phase that rotates with the smallest amount of current is determined as the excited phase in consideration of the switching pattern (e.g., rotating direction) (steps S430 through 482). For example, in case of the counterclockwise rotation, if the present phase current value is in a relation of a>b>c, the excited phase becomes "a" (steps 430, 432, and 434). The excited phase determined by the above method is stored (step S490).

In case the rotor is in the rotation state, a drive mode is performed (step S500).

Figure 7:
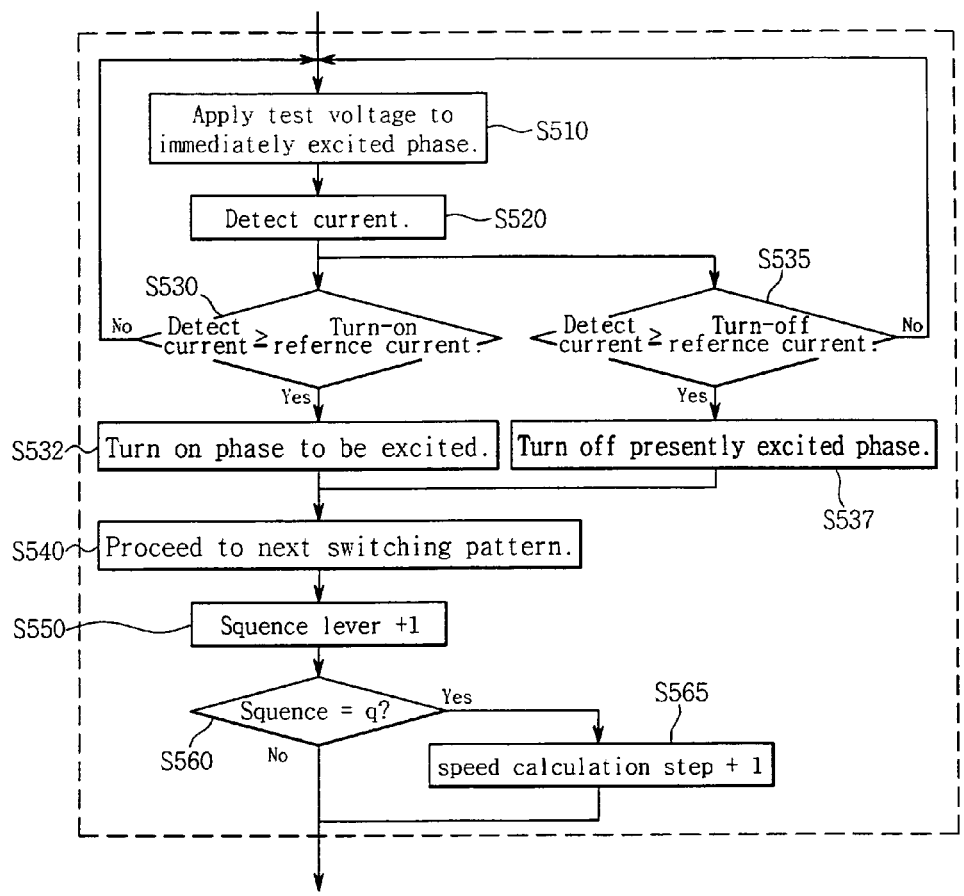
FIG. 7 is a flowchart concretely explaining the process of determining the phase excitation in the drive mode step shown in FIG. 2.
Figure 8A:
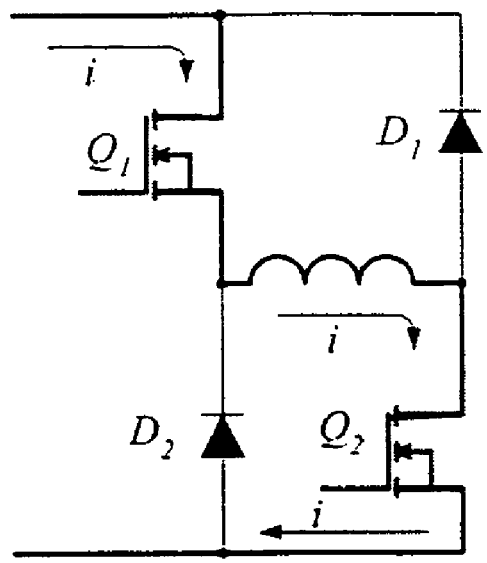
FIGS. 8a through 8c are views illustrating an example of an asymmetric inverter for applying the pulsed test voltage.
Figure 8B:
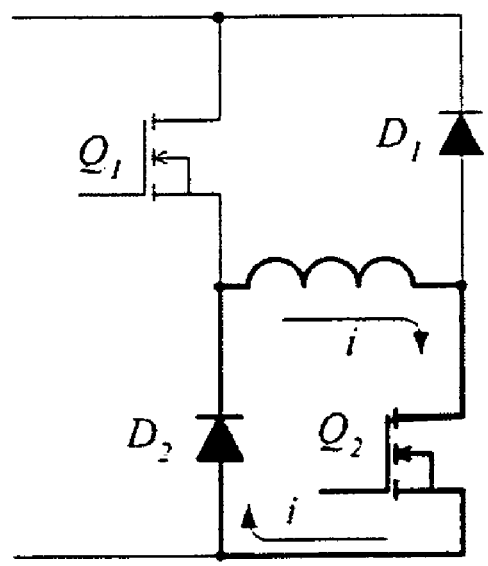
Figure 8C:
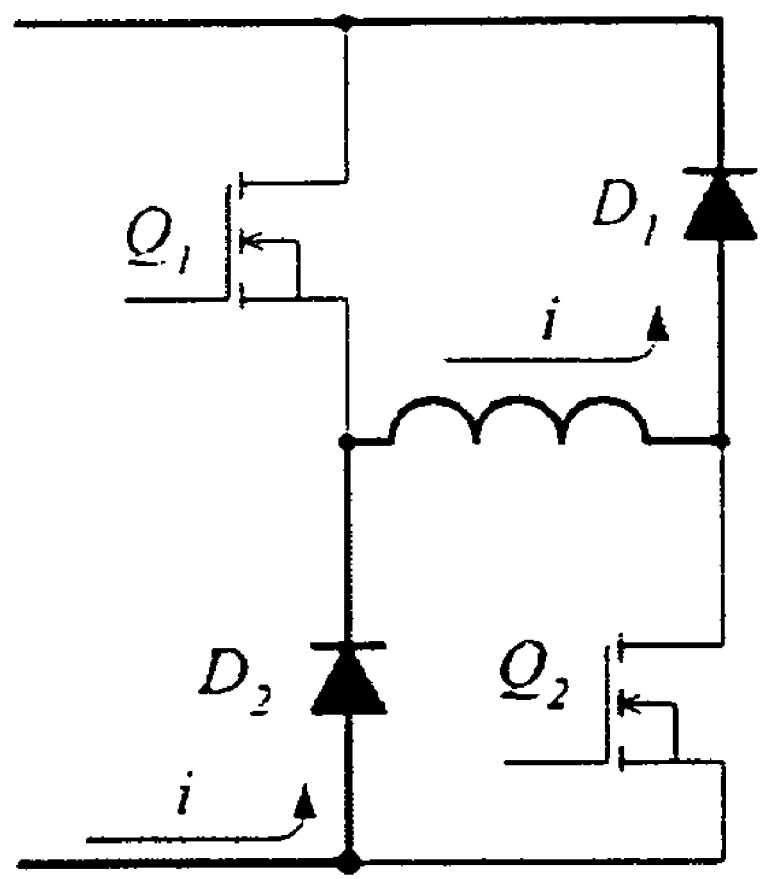
Figure 9:
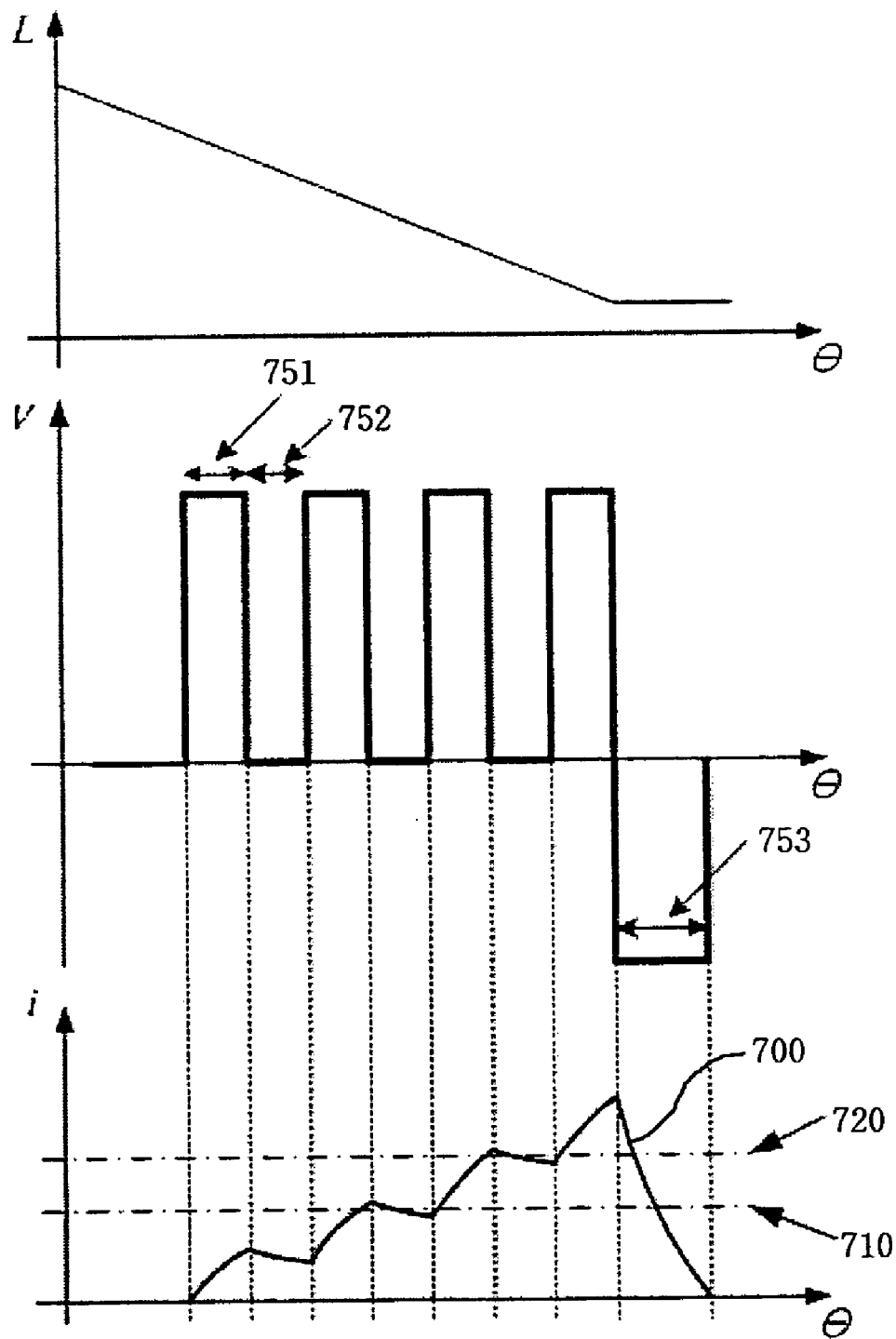
FIG. 9 is a graph depicting a waveform of the detected current generated according to a mode of an asymmetric inverter.

FIG. 7 is a flowchart concretely explaining the process of determining the phase excitation in the drive mode step shown in FIG. 2. If the excitation power is applied or the rotor is rotated by an exterior load, in the start-up mode, the start-up mode is converted into the drive mode. The operation of the drive mode according to the present invention will now be described with reference to FIG. 7. The pulsed test voltage is applied to a phase which is not neighboring (non-neighboring phase)(step S510). The expression "non-neighboring phase" means the immediately excited phase in the switching pattern. For example, in case the phase "a" is excited and the rotor is driven in the clockwise direction, the immediately excited phase becomes the phase "c" in a 3-phase SRM, or becomes the phase "d" in a 4-phase SRM. The phase to be next excited becomes the phase "b" in both the 3-phase and 4-phase SRM. FIGS. 8a through 8c are views illustrating an example of an asymmetric inverter for applying the pulsed test voltage. FIG. 9 is a graph depicting a waveform of the detected current generated according to the mode of the asymmetric inverter. FIG. 9 shows an example in which the pulsed test voltage is periodically applied.

If the asymmetric inverter is driven to apply the pulsed test voltage to the phase, the current 700 is detected (step S520). The pulsed test voltages 751, 752 and 753 are detected by the modes shown in FIGS. 8a, 8b and 8c, respectively. The current 700 is accumulatively added by the periodic application of the pulsed test voltage. The accumulatively added current 700 is compared with the first reference voltage (turn-on reference voltage) 710 and the second reference voltage (turn-off reference voltage) 720. In the drive mode, turn-on and turn-off times are controlled by use of the information on the presently exiting phase and the switching pattern. The pulsed test voltage to be applied is processed so that a value of the current is relatively continuously changed through soft chopping, as shown in FIGS. 8a through 8c. This may reduce an error produced when the current is detected, due to a time delay, and simply compare the turn-on reference current with the turn-off reference current. In order to simply compare the turn-on reference current with the turn-off reference current, the pulsed voltage is periodically applied, as shown in FIG. 9. The number of the periodical application may be varied depending upon the reference current value. If the current value exceeds the turn-off reference current value, a negative pulsed voltage 753 is applied so that the current value becomes zero. FIG. 8c shows one example of such a mode.

Figure 10:
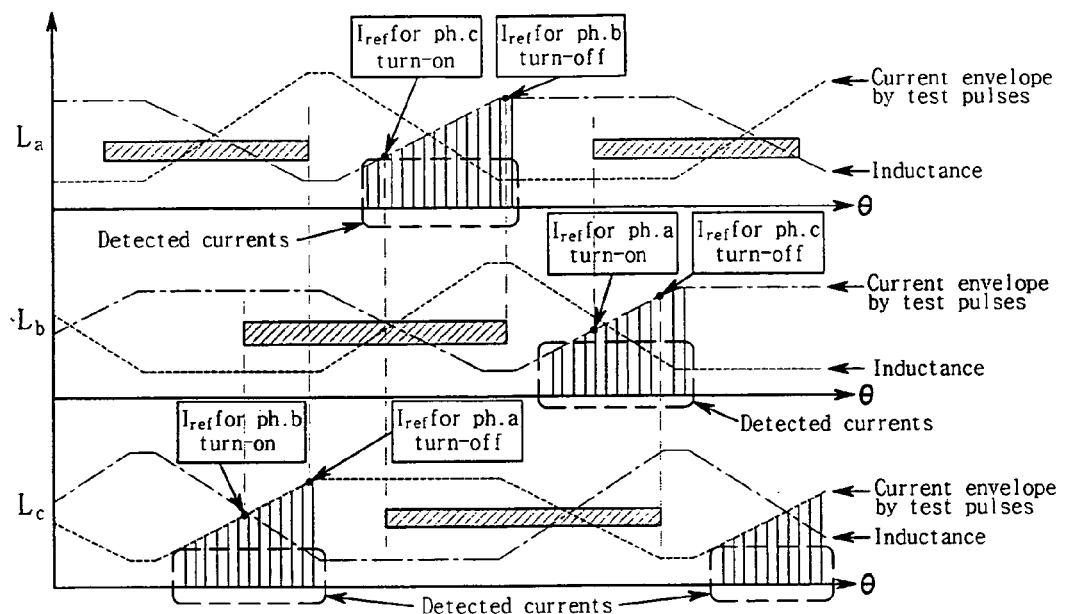
FIG. 10 is a graph depicting one example in which a phase excitation position is detected through comparison of detected currents.

FIG. 10 is a graph depicting one example in which the phase excitation position is detected through the comparison of the detected current. FIG. 10 shows the current generated when the pulsed test voltage is applied (current envelop by test pulse). The detected current in the phase "c" (Lc) is compared with the reference current (Iref for ph. b turn-on) set to turn on the phase to be next excited (phase "b") and the reference current (Iref for ph.a turn-on) set by the user to turn off the presently excited phase (phase "a") (steps S530 and 535). If the detected current is equal to or more than the reference current to turn on the phase to be next excited (phase "b"), the phase to be next excited (phase "b") is turned on (step S532). If the detected current 700 is equal to or more than the reference current to turn off the presently excited phase (phase "a"), the presently excited phase (phase "a") is turned off (step S537). The turn-on and turn-off are sequentially performed in each phase, so that the rotor rotates.

It proceeds to a next switching sequence (step S540). A sequence level is added by 1 (step S550). It is determined whether the sequence is q (step S560). Wherein, q=2π/ (stroke angle x number of poles). If the sequence is q, 1, which corresponds to one revolution, is added to a speed calculation step (step S565). Accordingly, if the sequence is q, it is judged as one revolution, and 1 is added to the speed calculation step, so that it can be used in calculating the number of revolutions per minute and rotation speed.

It is determined whether the above process is continuously performed, and if the process is continuously performed, the process below the step 300 is repeated (step S600).

TABLE 3

| | |
|---|---|
| Number of stator poles | 12 |
| Number of rotor poles | 8 |
| Diameter of stator outer | 132 [mm] |
| Diameter of rotor inner | 74 [mm] |
| Number of phases | 3 |
| Length of core | 28.7 [mm] |
| Length of air gap | 0.250 [mm] |
| Stator pole arc | 18 [deg.] |
| Rotor pole arc | 14 [deg.] |
| Winding resistance per phase | 0.536 [Ω] |
| Number of turns per phase | 200 [Turn] |

Figure 11:
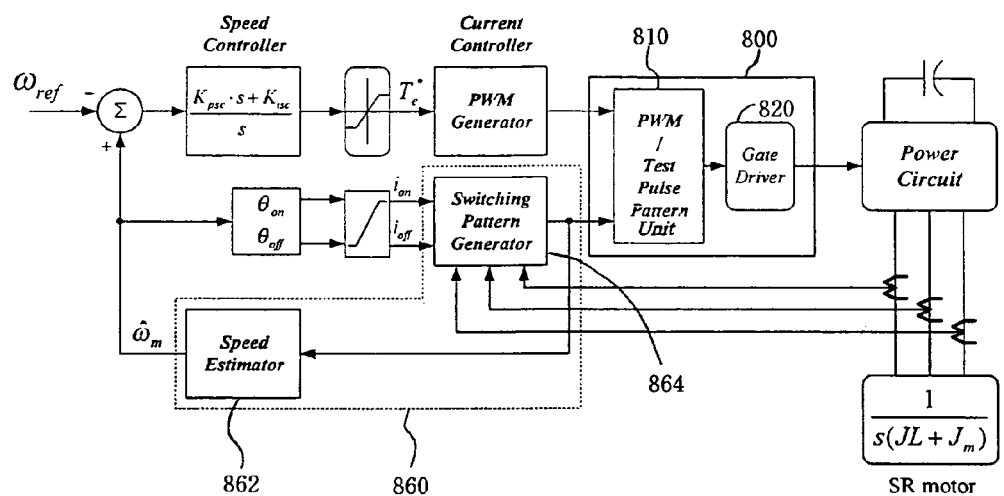
FIG. 11 is a block diagram illustrating one example of an SRM drive system according to the present invention.

FIG. 11 is a block diagram illustrating one example of an SRM drive system according to the present invention. The SRM drive system of the present invention is configured on the basis of 3-phase 12/8 SRM. The SRM for sensorless control of the 3-phase 12/8 SRM drive system utilizes short pitch windings under one-phase excitation, and an asymmetric bridge converter as an inverter. Herein, components associated with the present invention will be described, and other components do not described. A test-voltage applying unit 800 includes a PWM/test-pulse pattern unit 810 and a gate driver 820. The test-voltage applying unit 800 applies the test voltage to the SRM. In the PWM/test-pulse pattern unit 810, the PWM adjusts drive torque, and the test pulse is associated with the phase excitation. The gate driver 820 amplifies the output of the PWM/test-pulse pattern unit 810 to send this to a power circuit. A current detection sensor 840 detects the current generated by the test voltage in each phase of the SRM.

The switching pattern control unit 860 includes a speedometer 862 and a switching-pattern generator 864. The switching pattern control unit 860 controls the test-voltage applying unit 800 so as to apply the test pulse to the phase excited just prior to the presently excited phase. The switching-pattern control unit 860 turns on the phase to be next excited if the detected current is more than the first reference value, and turns off the phase excited just prior to the presently excited phase if the detected current is more than the second reference value. The switching-pattern control unit 860 controls the test-voltage applying unit 860 so as to apply the first and second test voltages to each phase of the SRM, and determines the operation state of the SRM based on the deviation between the currents detected in any one phase of the SRM. The first and second reference values are set through angles θ on and θ off to be excited. The angles θ on and θ off are calculated by use of the present speed ω n measured by the speedometer 862.

Figure 12:
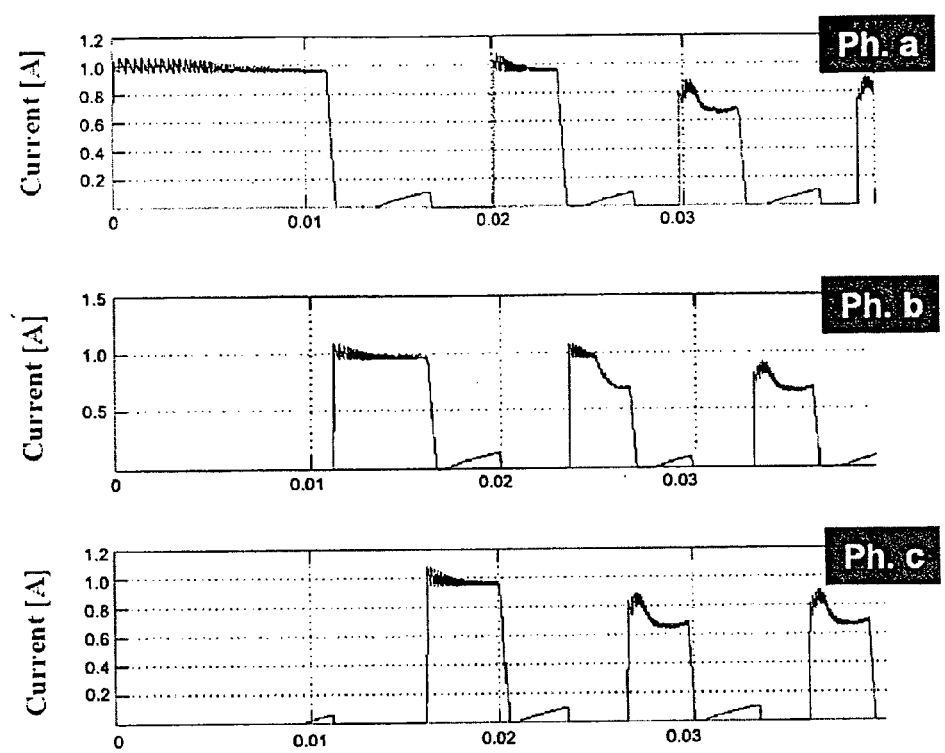
FIG. 12 is a graph depicting current waveforms resulted from the simulation performed by the method according to the present invention.

FIG. 12 is a graph depicting current waveforms resulted from the simulation performed by the method according to the present invention. It is the results of a Simulink simulation, and the rotation direction is a clockwise direction. FIG. 12 shows the current detected by the excitation signal and the pulsed voltage. At start-up, the pulsed test voltage is applied twice to all phases at the same time. If the current value detected by the second test voltage is in the relation of a>b>c and it is rotated in the counterclockwise direction, the phase excitation is achieved in the phase "a". Hence, the phase "a" is applied with the phase current to generate the torque. The phase "a" is applied with the pulsed test voltage as shown in FIG. 9. By comparing the detected current in the phase "a" with the turn-on reference current and overlapping the phase "b" with the phase "a", the phase "b" is excited. In turn, by comparing the detected current in the phase "c" with the turn-off reference voltage, the phase "a" is turned off.

Figure 13A:
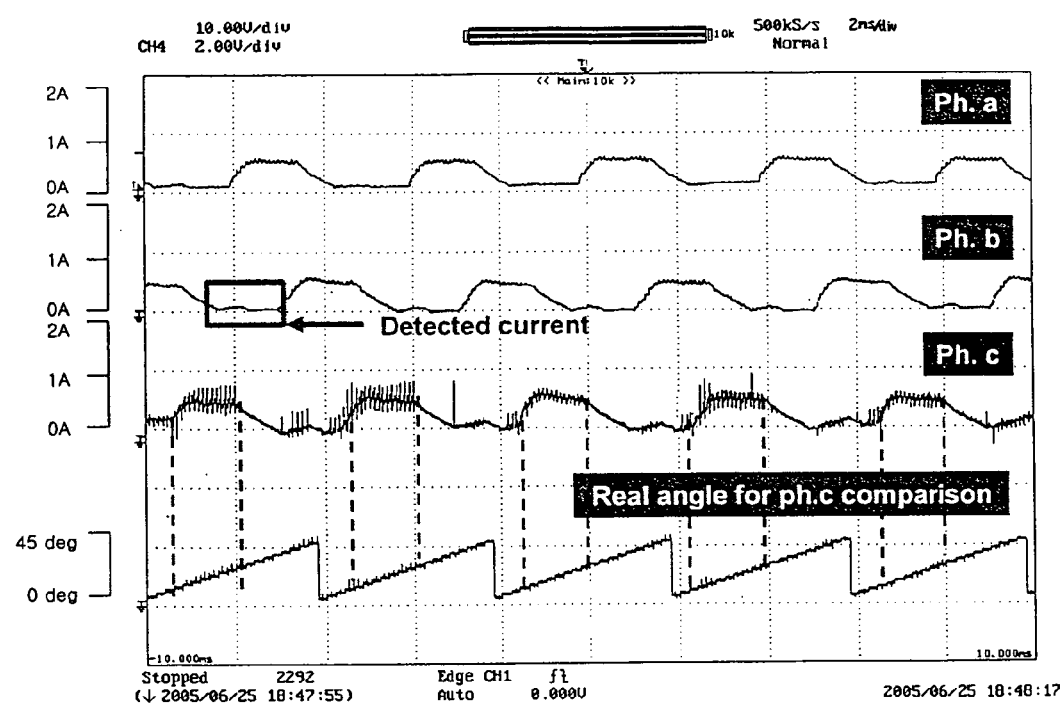
FIGS. 13a through 13c are graphs depicting the waveforms tested by the method according to the present invention.
Figure 13B:
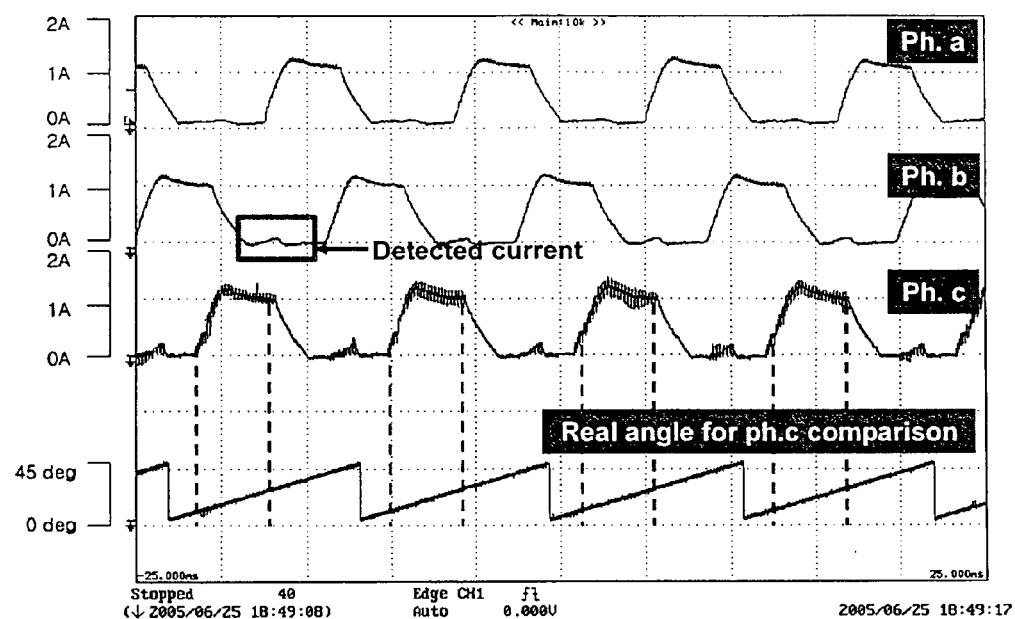
Figure 13C:
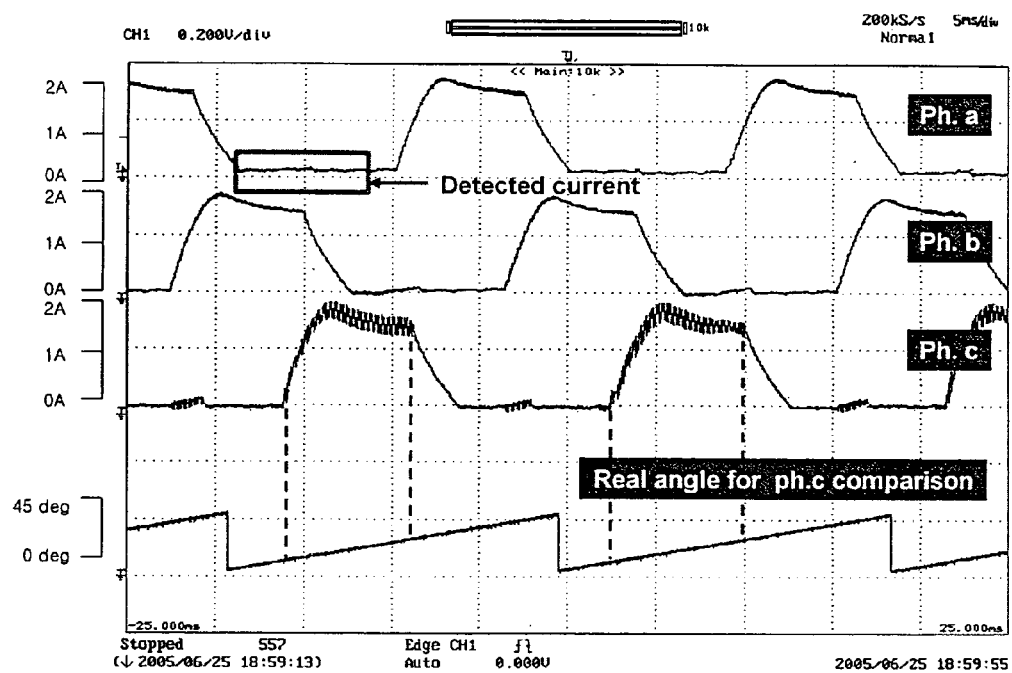

FIGS. 13a through 13c are graphs depicting the waveforms tested by the method according to the present invention. FIGS. 13a through 13c show the waveforms of the phase excitation current and the detected current in each phase, respectively, when the load of each motor is light, intermediate, and high. The ripple happening in the phase "c" is due to the noise generated from an oscilloscope. A range of one phase to be excited is in the range of 0 degree through 45 degrees. It would be understood from FIGS. 13a through 13c that the phase signal is periodically and accurately input at constant angle (about 5 degrees through 11 degrees and about 20 degrees). It is noted that the proper control is performed through the input of the phase signal.

As described above, according to the present invention, it can detect the time of the phase excitation according to the position of the rotor by partially applying the pulsed test voltage to the phase, without using a position sensor such as an encoder or a resolver. Further, exclusion of the position sensor may reduce a manufacturing cost thereof.

Also, according to the present invention, the excitation position for the start-up is determined by applying the pulsed test voltage to all phases and comparing the detected current values and the rotation direction. After the drive, the phase excitation is performed by applying the pulsed test voltage to the non-neighboring phase and comparing the detected current value with a designated switching-on reference current value and a designated switching-off reference current value. It can exclude a calculating operation for estimating the inductance through the above process, and thus simplify the signal process.

Further, according to the present invention, it can improve the stability by detecting the position of the phase excitation, without rotating the rotor in a reverse direction for the start-up. Hence, it can contribute to the manufacture of general purpose rotor of the SRM and the industry machines.

Although a preferred embodiment of the present invention has been-described for illustrative purposes, those skilled in the art will appreciate that various modifications, additions and substitutions are possible, without departing from the scope and spirit of the invention as disclosed in the accompanying claims.

What is claimed is:

1. A method for detecting an excitation position of an SRM by comparison of detected currents, the method comprising the steps of:
   detecting a first current by applying a first test voltage to each phase of the SRM;
   detecting a second current by applying a second test voltage to each phase of the SRM;
   determining an operation state of the SRM based on a deviation between the first current and the second current detected in any one of the phases; and
   determining a phase to be excited by mapping current values of the respective phases detected by applying the second test voltage onto a predetermined table.

2. The method as claimed in claim 1, further comprising:
   determining the operation state of the SRM as a standstill state if the deviation value is less than a predetermined value.

3. The method as claimed in claim 2, wherein in the table, the phase to be excited is designated so that a rotor is rotated with a phase in which a smallest current is detected by using the current values of the respective phases and a switching pattern of the rotor.

4. The method as claimed in claim 1, further comprising:
   determining the operation state of the SRM as a rotation state, if the deviation value exceeds a predetermined value, and applying a third test voltage to a phase excited just prior to a presently excited phase to detect the current; and
   turning on a phase to be next excited if the detected current value is more than a first reference value, and turning off the phase excited just prior to the presently excited phase if the detected current value is more than a second reference value.

5. The method as claimed in claim 4, wherein the current detected by applying the third test voltage to the phase is a current accumulatively added by applying the third test voltage consisting of two pulse voltages, and
   if the accumulatively added current value exceeds the second reference value, a negative pulse voltage is applied so that the accumulatively added current becomes zero.

6. The method as claimed in claim 5, wherein the first reference value is less than the second reference value.

7. An apparatus for detecting an excitation position of an SRM, comprising:
   a test-voltage applying unit for applying a test voltage to the SRM;
   a current detecting sensor for detecting a current generated by the test voltage; and
   a switching pattern control unit for controlling the test-voltage applying unit to apply the test voltage to a phase excited just prior to a presently excited phase, turning on a phase to be next excited if the detected current value is more than a first reference value, and turning off the phase excited just prior to the presently excited phase if the detected current value is more than a second reference value.

8. The apparatus as claimed in claim 7, wherein the switching pattern control unit controls the test-voltage applying unit to applying the first and second test voltages to each phase of the SRM and determines an operation state of the SRM based on a deviation between the currents detected in any one of phases of the SRM.

* * * * *